Aug. 14, 1956 R. F. PLUMB 2,758,700
MINERAL FILLER FEEDER
Filed Jan. 13, 1954 2 Sheets-Sheet 1

INVENTOR.
Robert F. Plumb
BY
Brown, Jackson, Boettcher + Dienner
Attys.

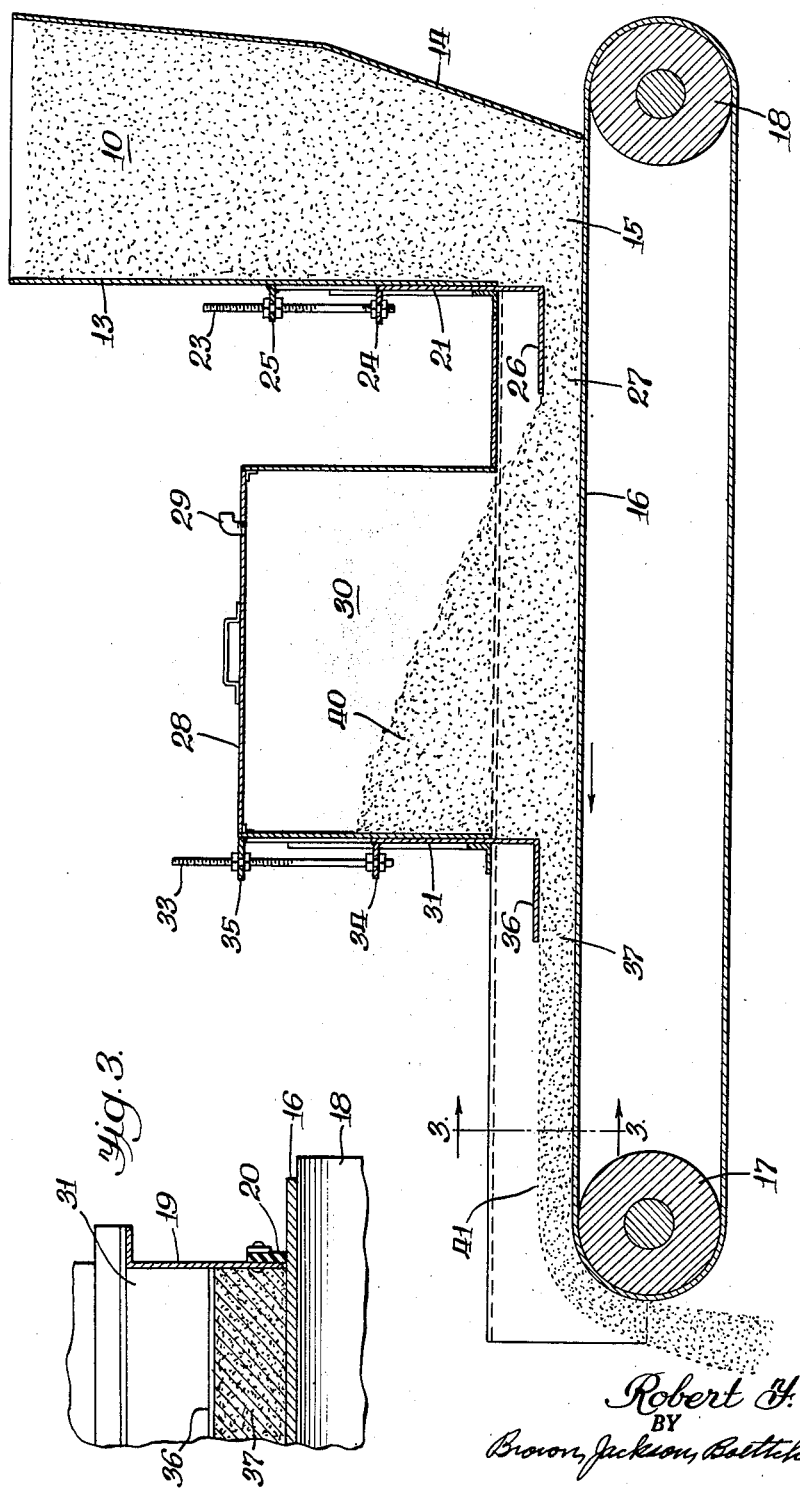

United States Patent Office 2,758,700
Patented Aug. 14, 1956

2,758,700

MINERAL FILLER FEEDER

Robert F. Plumb, Cedar Rapids, Iowa, assignor to Iowa Manufacturing Company of Cedar Rapids, Iowa, Cedar Rapids, Iowa, a corporation of Iowa Application January 13, 1954, Serial No. 403,865

5 Claims. (Cl. 198—57)

This invention relates to automatic proportioning feeders for bituminous mixing plants and the like, and has particular reference to a feeder adapted for use with mixing plants of the continuous type, as distinguished from the batch type. The general aim of the invention is to provide a feeding device adapted to supply a constant, accurately metered flow of finely powdered or pulverized mineral material such as cement, lime dust, or other dusts of similar consistency subject to aeration.

It has become more or less common practice to provide bituminous mixing plants of the general type disclosed in Pollitz Patent 2,493,898, for example, with continuous measuring and proportioning devices for the various components of the mix. It has been learned, however, that conventional measuring and feeding devices, while entirely satisfactory for use with sand, gravel, crushed stone and similar aggregates, are not entirely successful for feeding of the finer grades of pulverized materials such as lime dust or cement. Applicant has discovered that this effect is primarily by reason of the fact that these extremely fine mineral materials are of such nature that air becomes entrained therein in the process of handling or dumping into the bins of the feeding mechanism, and that this air may intermittently cause the material to exhibit a tendency to flow through small openings in a fluid-like manner. Thus, the flow of dust through the metering opening of a conventional feeding hopper will not necessarily be accurately controlled by the speed of the conveyor upon which the dust is carried, and there is a noticeable and undesirable tendency of the material to flow irregularly, or to surge through the feeding opening under certain conditions of operation. This phenomenon, which may be referred to as "flushing," renders conventional metering equipment inaccurate.

It is, therefore, the primary object of the present invention to provide a unique and improved feeder for mineral dust wherein the effects of aeration and consequent flushing are successfully eliminated so that the feeder is adapted to discharge extremely fine grades of mineral dust in a uniform, accurately measured and continuous stream.

The foregoing objects are accomplished according to the present invention by a unique conveyor and feeding mechanism illustrated in the drawings of this specification, wherein:

Figure 2 is a longitudinal sectional view through the mechanism of Figure 1; and Figure 3 is a fragmental detail sectional view taken substantially on the plane of the line 3—3 of Figure 2.

Figure 1:
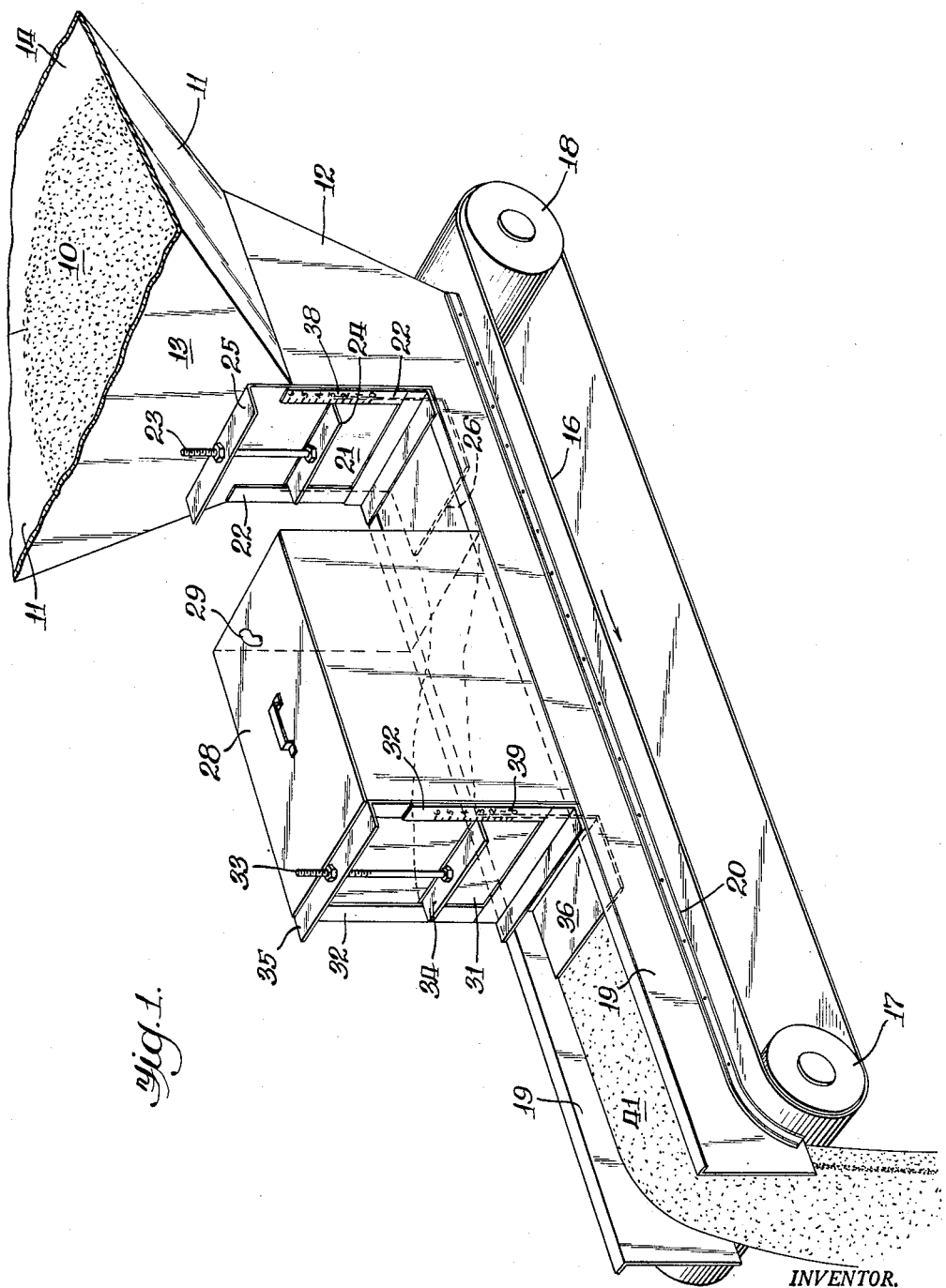
Figure 1 is a perspective view of a mineral filler feeder constructed in accordance with the principles of this invention.

The feeder mechanism includes a dust hopper generally designated at 10, which may be of any convenient size, but which is shown as provided with tapered upper side walls 11 and parallel sides 12 extending between a front wall 13 and back wall 14, which coact to define a discharge funnel 15 disposed immediately above a conveyor belt 16. The conveyor belt extends between a pair of pulleys 17 and 18, which drive the conveyor to the left, as viewed in the drawings. The side walls 12 of the dust hopper include a pair of parallel flanges 19 extending forwardly along the upper surface of the conveyor belt, and resilient sealing strips 20 (Figure 3), preferably of rubber, may be provided at the lower edges of these flanges to prevent undue leakage of dust between the lower edges of the flanges and the upper surface of the belt.

The material hopper 10 is provided with an adjustable primary metering gate 21. As shown, this gate is vertically slidable in ways 22 on the front wall 13 of the hopper. The gate may be shiftable manually, and is maintained in any desired position of adjustment by means of a threaded adjusting screw 23 which extends between an upper flange 24 on the gate and a fixed flange 25 on the front wall 13 of the hopper. The gate 21 is preferably provided with a strike-off plate 26, which may extend forwardly a considerable distance from the lower edge of the gate, in a plane substantially parallel with the top of the conveyor belt. Thus, the space between the plate 26 and the conveyor belt 16 provides the primary metering orifice 27 of the feeding mechanism.

The metering orifice 27 discharges dust into a closed sheet metal box 28 which is, however, provided with a vent fitting 29 to permit escape of air therefrom, so that the interior of the box may function as an expansion or surge chamber generally indicated at 30.

The left end of the box 28 is provided with a secondary metering gate 31 which may be identical with the gate 21, and has corresponding mounting, adjusting and strike-off parts 32 to 36. This gate 31 thus serves to provide a secondary adjustable metering orifice 37 between the strike-off plate 36 and the top of the conveyor belt. If desired, the ways 22 and 32 may be marked with the indicia shown at 38 and 39 providing means for readily effecting any desired setting of the primary and secondary gates for any specified conditions of operation.

In operation, the hopper 10 is filled with mineral dust and the conveyor 16 is driven in the direction indicated. Thus, a stream of the powdered material from the hopper will be carried to the left through the primary metering orifice 27 and into the surge chamber 30. It is to be expected, however, that at intervals the powdered material in the bin 10 will exhibit the tendencies of fluid-like flow known as "flushing," and will surge through the primary metering orifice at an irregular rate. When flushing or surging occurs, however, the air entrained in the excess dust "boils out" or comes to the surface of the moving dust, as it swirls into the chamber 30. The air entrapped in the material is thus vented through the fitting 29 and a pile 40 of de-aerated dust accumulates within the chamber 30. The continued movement of the conveyor belt 16 carries this de-aerated dust through the secondary metering orifice 37. The dust is adequately de-aerated before the secondary measuring takes place, however, with the result that the dust flows through the orifice 37 in a ribbon 41 of uniform thickness, moving at a uniform rate governed wholly by the speed of the conveyor belt. The dust is thus devoid of air as it passes through the secondary metering aperture and, as a result, it may be accurately metered and the precise flow desired may be achieved by adjusting the position of the primary and secondary gates.

The expansion chamber 30 is sufficiently large that it may accumulate a rather sizable quantity of the mineral dust. In the normal functioning of the device the gates may be adjusted to the same height, as shown, so that the primary aperture 27 and secondary aperture 37 are of substantially the same size. Under these typical conditions, the rising level of the dust pile 40 in the chamber 30 will develop a head of material in the expansion chamber which becomes sufficient to oppose the ingress of more dust through the primary metering orifice 27, until a state of operating equilibrium is reached. When there is a sufficient accumulation of dust in the chamber 30 the material will flow into the expansion chamber only as fast as it leaves the chamber through the secondary aperture 37.

It will be understood that changes in detail may be resorted to without departing from the field and scope of my invention, and I intend to include as such variations, as fall within the scope of the appended claims, in this application in which a preferred form only of my invention has been disclosed.

Having thus described my invention, what I claim as new and desire to secure by United States Letters Patent is:

1. In a feeder for pulverulent materials such as mineral dust, a conveyor comprising an imperforate member effective for moving the material in one direction, a dust bin overlying said member open thereto at its bottom and having an outlet opening at its front wall, a primary metering gate controlling said opening and extending the full width thereof, a surge chamber in front of said bin receiving material delivered therefrom, said chamber having an outlet opening at its front wall and a vent to atmosphere from its upper portion and being otherwise closed, and a secondary metering gate controlling and extending the full width of said surge chamber outlet opening.

2. In a feeder for pulverulent materials such as mineral dust, a conveyor comprising an imperforate member effective for moving the material in one direction, a dust bin overlying said member open thereto at its bottom, material retaining members extending from the sides of said bin forwardly along the sides of said conveyor member and above the latter for retaining the material thereon, said bin having an outlet opening at its front wall extending between said retaining members, a primary metering gate controlling said opening and extending the full width thereof, a surge chamber in front of said bin mounted on said retaining members and open at its bottom, said surge chamber having a vent to atmosphere from its upper portion and being otherwise closed, the space between said retaining members at the front of said surge chamber constituting an outlet opening therefrom, and a secondary metering gate controlling and extending the full width of said surge chamber outlet opening.

3. In a feeder for pulverulent material such as mineral dust, a downwardly opening dust bin, a downwardly opening surge chamber, a conveyor comprising a member underlying said bin and chamber and effective for moving the material from said bin through said chamber to a point of discharge, said bin having an outlet opening at its front wall and said chamber having an inlet opening at its rear wall and an outlet opening at its front wall, a primary metering gate controlling said bin outlet opening and extending the full width thereof, and a secondary metering gate controlling said chamber outlet opening and extending the full width thereof.

4. In a feeder for pulverulent materials such as mineral dust, a conveyor comprising an imperforate endless belt driven in one direction, a dust bin overlying the upper run of said belt and open thereto at its bottom, material retaining members extending from the sides of said bin forwardly along the sides of said upper run and above the latter for retaining the material thereon, said bin having a outlet opening at its front wall extending between said retaining members, a primary metering gate controlling said opening and extending the full width thereof, a surge chamber in front of said bin mounted on said retaining members and open at its bottom, said chamber having a vent to atmosphere from its upper portion and being otherwise closed, the space between said retaining members at the front of said surge chamber constituting an outlet opening therefrom, and a secondary metering gate controlling and extending the full width of said surge chamber outlet opening.

5. In a feeder for pulverulent materials such as mineral dust, a conveyor comprising an imperforate endless belt driven in one direction, a dust bin overlying the upper run of said belt and having an outlet opening at its front wall, a surge chamber in front of said bin overlying the upper run of said conveyor open thereto at its bottom and having an inlet opening at its rear wall and an outlet opening at its front wall, said belt being effective for conveying the material from said bin into said chamber and from the latter to a point of discharge, a primary metering gate controlling and extending the full width of said bin outlet opening, and a secondary metering gate controlling and extending the full width of said chamber outlet opening.

References Cited in the file of this patent

UNITED STATES PATENTS

| | | |
|---|---|---|
| 2,007,874 | Redler | July 9, 1935 |
| 2,035,410 | Smith | Mar. 24, 1936 |
| 2,661,830 | Total | Dec. 8, 1953 |